United States Patent
Gandhi et al.

(10) Patent No.: US 10,412,425 B2
(45) Date of Patent: Sep. 10, 2019

(54) PROCESSING GAPS IN AUDIO AND VIDEO STREAMS

(71) Applicant: Facebook, Inc., Menlo Park, CA (US)

(72) Inventors: Sonal Gandhi, Seattle, WA (US); Mathieu R. Henaire, Redmond, WA (US); Amit Puntambekar, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/863,804

(22) Filed: Jan. 5, 2018

(65) Prior Publication Data

US 2019/0215542 A1 Jul. 11, 2019

(51) Int. Cl.

| | |
|---|---|
| *H04N 21/2368* | (2011.01) |
| *H04N 21/236* | (2011.01) |
| *H04N 21/235* | (2011.01) |
| *H04N 21/234* | (2011.01) |
| *H04N 21/242* | (2011.01) |
| *H04N 21/8547* | (2011.01) |
| *H04N 21/2187* | (2011.01) |
| *G10L 19/012* | (2013.01) |
| *H04N 21/233* | (2011.01) |
| *G11B 27/10* | (2006.01) |

(52) U.S. Cl.
CPC ....... *H04N 21/2368* (2013.01); *G10L 19/012* (2013.01); *G11B 27/10* (2013.01); *H04N 21/2187* (2013.01); *H04N 21/233* (2013.01); *H04N 21/2353* (2013.01); *H04N 21/23418* (2013.01); *H04N 21/23605* (2013.01); *H04N 21/242* (2013.01); *H04N 21/8547* (2013.01)

(58) Field of Classification Search
USPC .......................................... 386/239–248, 285
See application file for complete search history.

(56) References Cited

U.S. PATENT DOCUMENTS

2009/0169177 A1\* 7/2009 Ui ............................ H04N 5/85
   386/338
2014/0153909 A1\* 6/2014 MacInnis ............. H04N 19/436
   386/353

\* cited by examiner

*Primary Examiner* — Hung Q Dang
(74) *Attorney, Agent, or Firm* — Baker Botts L.L.P.

(57) ABSTRACT

In one embodiment, a method includes receiving a series of a series of audio-and-video segment pairs in a live video feed. The series of audio-and-video segment pairs is traversed, comparing the end-time of a current audio-and-video segment with the start-time of the next audio-and-video segment pair, in the sequence, and identifying any time gap between consecutive audio-and-video segment pairs. When a time gap is identified, the end-time of a current segment pair is subtracted from the start time of the next segment-pair to define an offset time, and subsequent start times of segment pairs in the sequence are adjusted based on this offset time. If after adjusting a start time of the next segment-pair by the offset time, a gap in the audio segment remains, then the gap is filled with an encoded silence sequence.

20 Claims, 10 Drawing Sheets

PROCESSING GAPS IN AUDIO AND VIDEO STREAMS

TECHNICAL FIELD

This disclosure generally relates to video streaming, and particularly to correcting for breaks in a video stream.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a life broadcast or newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information, including live broadcasts, with other users in their social networks.

SUMMARY OF PARTICULAR EMBODIMENTS

Digital multimedia may be encoded using a (media) container format that may encapsulate video content, audio content, or related information. A decoder may use the information in a media container to extract the encapsulated content for an audience.

During a live video stream of multimedia information, some video content or audio content may be lost, or otherwise not delivered to its intended recipient. This may create gaps in the received video or audio content. A received live video stream, e.g., a live broadcast, may be recorded (e.g., encoded into video content containers and audio content containers), and repackaged for later distribution via a video streaming format, such as a video-on-demand format. This repackaging may be complicated by some recorded video content missing corresponding audio content that was lost, some recorded audio content missing corresponding video content that was lost, and a desire to maintain audio and video content synchronized in spite of audio and video gaps in the record live video stream. When repackaging the recorded live video stream, it is desirable to avoid gaps in the audio stream since gaps in an audio stream may cause difficulties for some multimedia decoders. It is also desirable that all recorded multimedia information be included in the repackaging for video streaming, including any video content missing corresponding audio content that was lost and any audio content missing corresponding video content that was lost. Repackaging (e.g., encoding) the recorded live broadcast for video streaming may include creation of a media file (e.g., a multiplex file) that combines multiple elements (e.g., video content, audio content, timing information of the recorded live broadcast, segment duration, etc.) that enable control of the distribution delivery process into a single file. In particular embodiments, the recorded live broadcast may be subjected to a pre-muxing (e.g., pre-multiplexing) step to remove video and audio gaps, to assure that all recorded audio and video content is included, and to maintain synchronicity between corresponding video and audio contents, prior to creation of the media (e.g., multiplex) file.

In particular embodiments, a computing device (e.g., a Facebook server such as a live broadcast server or a streaming video server), may access a series of data-unit pairs. For example, a data-unit may be a media container encapsulating multimedia information, and a series of data-unit pairs may be a series of audio-and-video segment pairs, such as of a recorded live broadcast. Thus, each data-unit pair may include a video data-unit having respective video content (e.g., a video content container) and an audio data-unit having respective audio content (e.g., an audio content container).

In a pre-muxing step, the computing device corrects for time gaps between consecutive data-unit pairs in the series of data-unit pairs to define a pre-muxed sequence of data-unit pairs. Basically, a pre-muxer unit may determine any time gap between the end of a first data-unit pair and a next data-unit pair. Any identified time gap may be termed a time-adjustment value, or running offset, which may then be used to adjust the audio segment and video segment of the next data-unit pair. It is noted that the identified time-adjustment value may have a value of zero if there is no time gap between the end of the first data-unit pair and start of the next data-unit pair. If, after adjusting the audio segment of the next data-unit pair, there is still a time gap between the audio segment of the first data-unit pair and the audio segment of the next data-unit pair, then this time gap is filled with an (encoded) silence buffer (e.g., a silence sequence). In more detail, a pre-muxing step may include: (1) for a first data-unit pair (in the series of data-unit pairs) that includes a first video data-unit and first audio data unit, identifying a first video-ending-time of the first video data-unit's respective video content (e.g., the ending time of the respective video content) and a first audio-ending-time of the first audio data-unit's respective audio content (e.g., the ending time of the respective audio content); (2) for a next data-unit pair (in the series of data-unit pairs) that includes a next video data-unit and next audio data unit, where the next data-unit pair is next in chronological starting order to the first data-unit pair (e.g. the starting time of first data-unit pair precedes the starting time of the next data-unit pair), identifying a next video-start-time of the next video data-unit's respective video content (e.g., the starting time of the respective video content) and a next audio-start-time of the next audio data-unit's respective audio content (e.g., the starting time of the respective audio content); (3) determining a time-difference between, the earlier of the next video-start-time and the next audio-start-time, and, the later of the first video-ending-time and first audio-ending-time, to define a time-adjustment value; (4) adjusting the next video-start-time based on the time-adjustment value to define an adjusted next video-start-time (e.g., the next video-start-time may be shifted up by the time-adjustment value); (5) adjusting the next audio-start-time based on the time-adjustment value to define an adjusted next audio-start-time (e.g., the next audio-start-time may be shifted up by the time-adjustment value); and (6) inserting a silence buffer, if needed, to substantially fill any time gap between the first audio-ending-time and the adjusted next audio-start-time (e.g., if after shifting up the next audio-start-time, there is still a time gap between the start of the next audio data unit's audio content (e.g., the adjusted next audio-start-time) and the end of the first audio data-unit's audio content (e.g., first audio-ending-time), then fill this time gap with an encoded silence).

After processing the series of data-unit pairs in the pre-muxing step (e.g., to remove video and audio gaps, to assure that all recorded audio and video content is included in spite of the gaps, and to maintain synchronicity between corresponding video content and audio content), the computing device, may then (re-)multiplex the pre-muxed sequence of data-unit pairs to define a media file, such as suitable for streaming The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
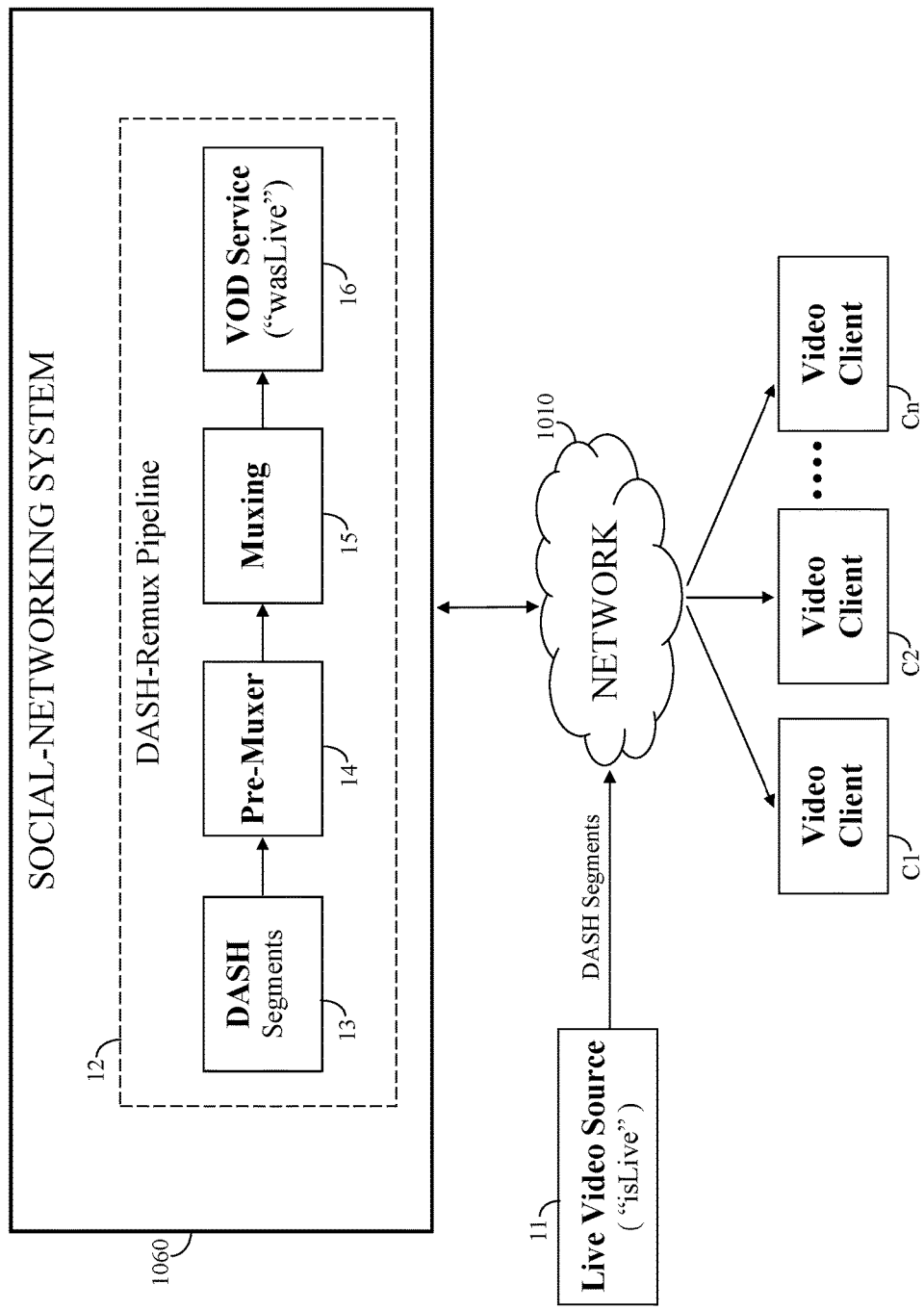
FIG. 1 illustrates an example live video streaming environment.

When users live stream video over a network, such as the Internet, (e.g., via Facebook using applications such as Facebook live or Instagram live), there are sometimes gaps in the video input stream or the audio input stream received from the users. This may be caused by several factors, including a poor data connection, unreliability of a particular protocol used for streaming the data (e.g., User Datagram Protocol, UDP), or bugs in third-party providers who are streaming over a social-networking system (explained below), or other networking system.

When a gap in audio or video occurs during a live video (e.g., a live video broadcast), the live viewing audience must endure the gap. However, the live video stream may be recorded for later viewing, such as through video-on-demand (VOD) streaming. In this case, there is no need for a viewing audience to sit through the same gaps when they are watching it after it was recorded, such as through via video-on-demand. To solve this problem, existing technology merely collapses the gaps in audio and video, but this leads to asynchronous playback of the audio and video (e.g., video and audio content not being synchronized). For example, if during a live video, there is a three second gap in audio, and a five second gap in video, existing systems may collapse the audio gap by three seconds and the video gap by five seconds. This may be because existing technology assumes a well-behaved multimedia recording (e.g., assumes no missing video content, or no missing audio content, or no uneven gaps in audio and video content, or no content segment jumps back in time to precede the end of a previous content segment).

As a solution, the social-networking system (SN) may use a pre-multiplexer to process the audio and video simultaneously. The pre-multiplexer may track timestamps associated with both audio content and video content and insert gaps of silence or leave a "frozen screen" for an appropriate amount of time to ensure synchronous playback of audio and video. In the above example with a three second gap in audio and a five second gap in video, the SN may determine the difference between the audio gap and the video gap and may add the difference (e.g., 2 seconds) as a silence gap to the audio to keep its chronological position relative to corresponding video content consistent. For example, the SN may insert two-seconds of silence to the 3 second gap in the audio, and then collapse the three-second audio gap. The resulting A/V output may appear as if there is no gap in video and or audio (but the audio has an encoded two seconds of silence). In the inverse case (e.g., a 5 second gap in audio and 3 second gap in video), it may not be necessary to insert any video in the two second difference in the video gap and audio gap because, as long as the timestamps of corresponding video and audio content are maintained synchronized, any gap in the video may be filled with a "still image" of the immediately preceding video segment. A goal is to have audio and video streams that play back a continuous, synchronized stream of data without dropping (losing) any of the recorded multimedia content.

There are a few different scenarios in which gaps in audio and video data could occur and in which asynchronous playback is an issue: (1) gap in video but no gap in audio, (2) gap in audio, but no gap in video, (3) equal gaps in audio and video (4) gap in video is longer than gap in audio, (5) gap in audio is longer than gap in video, (6) an overlap in video data (e.g., the same video packet is sent twice to the server due to bugs in third party system), and unchanged audio data, (7) an overlap in audio data and unchanged video data, (8) an overlap in video data that is longer than an overlap in audio data, (9) an overlap in audio data that is longer than an overlap in video data, (10) a gap in video data and an overlap in audio data, and (11) an overlap in video data and a gap in audio data. Each of these cases is handled by the SN via the pre-multiplexer. The basic idea is that in gaps, the SN determines the shorts time gap between subsequent multimedia content. For example, the SN may determine the shortest time gap between subsequent audio-and-video segments. That is, the SN may determine a time gap between the later ending time of a first video segment and a first audio segment, and the earlier starting of a next video segment and next audio segment. The next video segment and audio segment may then be collapsed by this shortest time gap, and any remaining time gap within the audio stream may be filled with an encoded silence sequence.

For example with overlaps, the SN may determine the difference between the two overlaps and add the difference to the smaller overlap. For example, if the audio stream as a 2 second overlap and the video stream has a 6 second overlap, if left unchanged, the video stream will play 4 seconds ahead of the audio stream for the remainder of the playback. To avoid this from happening, the SN may determine the difference between the two overlaps (e.g., 6−2=4) and add a gap of that duration to the audio stream so that the audio stream will have a 4 second gap of silence but will play in synch with the video.

FIG. 1 illustrates an example live video streaming environment. The present example including a live video source 11 (e.g., an individual user or a third-party system) transmitting (e.g., broadcasting) a live video over a computer network 1010 (e.g., the Internet, or other IP network) via a social-networking system 1060 to one or more clients C1 to Cn. For example, social-network system 1060 may route the live video stream from live video source 11 to select clients C1 to Cn based on a social graph (described below).

Data transmission, such as multimedia transmissions, over a network may be made using different internet protocols (IP). Typically, however, TCP (transmission control protocol) is used for transmission of stored video (e.g., pre-recorded video, such as via video-on-demand, VOD), and UDP (user datagram protocol) is used for transmission of live video. TCP includes handshaking dialog and provides a relatively secure transmission channel, but such an approach may not be practical for live video transmissions (e.g., broadcasts) where the number of clients may be large, since this would require that a video source transmission device (or source application or source operating system) buffer any unacknowledged segments from every client. Therefore, live video streaming applications, and devices, typically do not provide support for TCP live video transmission. Rather, UDP is typically used for live video streaming since it provides quick connections without handshake dialogues, but at the expense of possible data loss. UDP permits a source application to send messages (e.g., datagrams) on an IP network without requiring prior communications to establish communication channels, which simplifies the broadcast of live videos to a large number of clients. These features, however, also expose the source application to any unreliability issues on the network since there is no guarantee of segment delivery, ordering, or duplicate protection.

Nonetheless, for ease of implementation and compatibility with multiple source applications, the live video source 11 is herein assumed to transmit using UDP, which may introduces error. For example, live video source 11 may use an application, such as "isLive ABR" (adaptive bitrate), to send DASH segments through network 1010 to the social-networking system 1060, which may direct the DASH segments to appropriate clients C1 to Cn and also save the received DASH segments. DASH, or Dynamic Adaptive Streaming over HTTP, is an adaptive bitrate streaming technique that enables streaming of media content over the Internet. DASH breaks the content into a sequence of small HTTP-based file segments, each segment containing a short interval of playback time of content.

The social-networking system (SN) 1060 may repackage the saved DASH segments into a multimedia file suitable for streaming at a later time. For example, the SN 1060 may provide a service, such as "wasLive", by which it may stream to clients repackaged multimedia files of previously recorded live video streams, such as in a video-on-demand (VOD) manner. Service wasLive may make use of a DASH-Remux pipeline 12 (e.g., an encoding pipeline) where DASH segments from isLive are remuxed to make Live VODs. Existing industry tools, such as ffmpeg and mp4box, are not well-suited to fore directly encoding received DASH segments because they do not provide enough flexibility and control to handle irregularities in timestamps to create a good Live VOD experience. That is, existing industry tools, such as ffmpeg, do not handle situations where audio and video content experienced unequal and uneven gaps (e.g. loss of content) during a live video stream. It is noted that in live video streaming (especially using UDP), audio content or video content may be separately lost, delayed, received out of order, or received in duplicate. During the live video stream, this may result in frozen images, lost audio, jumps forward or backward in the stream, unsynchronized audio and video content, etc. If existing industry tools were used to directly encode received DASH segments, audio and video content would quickly fall out of synchronicity, some gaps would not be collapsed, or video content that did not have any corresponding audio content might be cut from the final remuxed file.

The present DASH-Remux pipeline 12 aims to remove such errors without loss of any recorded (e.g., received DASH) video content or recorded (e.g., received DASH) audio content. To achieve this, the present encoding pipeline submits received DASH segments 13 to a pre-muxer (processing block) 14 prior to being remuxed in muxing block 15. The results of muxing block 15 are multimedia files (e.g., VOD files) managed by wasLive block 16, which may provide VOD services to clients, e.g., C1 to Cn. Pre-muxer 14 analyzes and rewrite timestamps of live DASH segments 13 before being remuxed in muxing block 15 to make Live VODs (e.g., multimedia files). The pre-muxer 14 prevents stalls and Audio-Video sync issues in Live VODs, and is well-suited for UDP-based Live-video and Internet broadcasts, where large uneven gaps in audio and video timestamps are very common due to packet loss.

Figure 2:
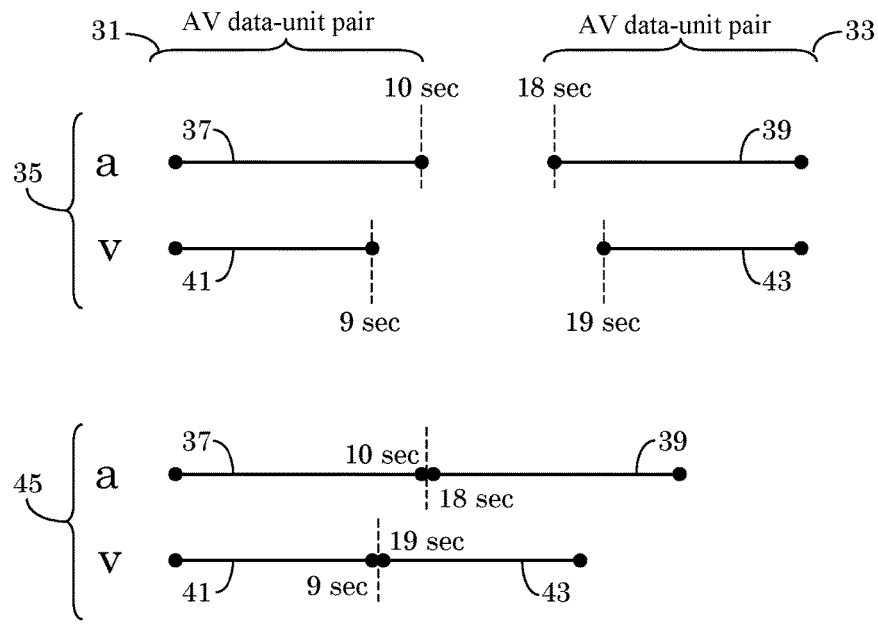
FIG. 2 illustrates an example of using ffmpeg to correct for gaps in two consecutive AV data-unit pairs in a live video stream.

FIG. 2 illustrates an example of using ffmpeg to correct for gaps in two consecutive AV data-unit pairs, 31 and 33, in a live video stream 35. In the present example, each AV data-unit pair include an audio data-unit "a" (e.g., audio content segment) and a corresponding video data-unit "v" (e.g., video content segment). In the present example, the audio stream from one AV data-unit pair 31 to the next 33 experiences an eight second gap break. That is, the audio content 37 of the first AV data-unit pairs 31 ends at time ten seconds (in a timeline), and the audio content 39 of the next AV data-unit pair 33 begins at time eighteen seconds (in the same timeline). Similarly, the video stream experiences a ten second gap. The video content 41 of AV data-unit pair 31 ends at time nine seconds, and video content 43 of the next AV data-unit pair 33 starts at time nineteen seconds.

If one were to use a typical industry tool like ffmpeg to address these time gaps, one would have few options. One option would be do nothing, and thereby maintain audio and video contents synchronized in their respective AV data-unit pairs 31 and 33. This may be achieved by use of ffmpeg's dts_delta_threshold option, which specifies a minimum size gap that gets collapsed. In the present example, the dts_delta_threshold option may be set 11 seconds so that neither the 8 second audio gap nor 10 second audio gap gets collapsed. This will maintain the AV sync, but this solution is suboptimal since it will show a frozen image frame for 10 seconds in the video (e.g., display the last image frame of AV data-unit pair 31, which is displayed at time 9 seconds). Alternatively, the dts_delta_threshold option may be set to 8 seconds so that both the audio gap and video gap get collapsed, as illustrated by collapsed AV stream 45. This however, causes AV sync issues since at the 9 second point, the video jumps to an image corresponding to the 19 second point, and continues from there, while the audio stream still corresponds to the 9 second point. When the audio jumps from the 10 second point to the 19 second point, the video will still be ahead of the audio by one second.

Figure 3:
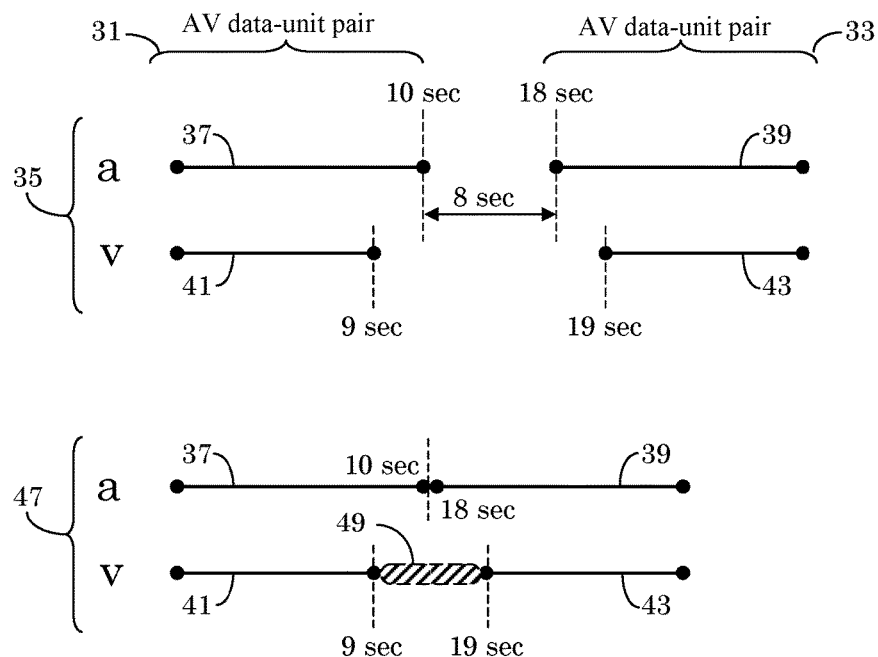
FIG. 3 illustrates an example of how the pre-muxer 14 may process the audio and video gaps of FIG. 2.

FIG. 3 illustrates an example of how the pre-muxer 14 may process the audio and video gaps of FIG. 2. More than 10% of live broadcasts have jumps greater than one second in audio or video timestamps. The pre-muxer analyzes the jumps in timestamps and rewrites the audio and video timestamps such that: (1) it prevents stalls by removing gaps in both audio; and video and (2) it prevents AV sync issues by making sure audio and video content does not move relative to each other. In the present example of live video stream 35, the pre-muxer identifies the ending time of whichever of the audio content 37 or video content 41 of the first AV data-unit pair 31 ends last. In the present example, the audio content 37 ends at time 10 seconds, and the video content ends at 9 seconds, so that the later-ending time is 10 seconds (of the audio content 39). The pre-muxer also identifies the starting time of whichever of the audio content 39 or video content 43 of the next AV data-unit pair 33 starts first. In the present example, the audio content 39 starts at time 18 seconds, and the video content 43 starts at time 19 seconds, so that the earlier-starting time is 18 seconds (of the audio content 39). The pre-muxer 14 then collapses the later-ending time and the earlier starting time irrespective of whether they correspond to different types of content (i.e., one is audio content and the other is video content), but in the present example, both correspond to audio content. Since the difference between the earlier-starting time (18 seconds) and the later-ending time (10 seconds) is 8 seconds, this defines a time-adjustment value (or local offset) of 8 seconds, and both the audio content 39 and video content 43 of the next AV data-unit pair 33 are collapsed by 8 seconds, as illustrated by collapsed AV stream 47. As illustrate, this result in a frozen image phase 49 for 2 second (e.g., the original 10 second gap less the collapsed 8 seconds), but corresponding video and audio content remain in sync at all times.

Figure 4:
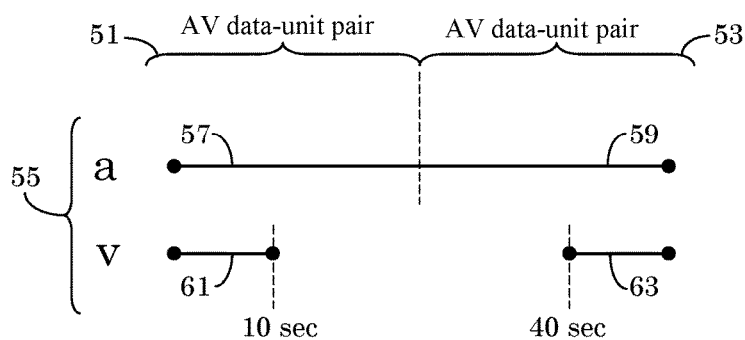
FIG. 4 illustrates an example live video stream 55 having a gap in video content in two consecutive AV data-unit pairs, 51 and 53, and no gap in audio content.

FIG. 4 illustrates an example live video stream 55 having a gap in video content in two consecutive AV data-unit pairs, 51 and 53, and no gap in audio content. As shown, audio content 57 from the first AV data-unit pair 51 flows continuously (e.g., no gap) into the audio content 59 of the next AV data-unit pair 53, as determined by respective audio timestamps of first AV data-unit pair 51 and next AV data-unit pair 53. The video content 61 of the first AV data-unit pair 51, however, ends at the 10 second mark, and the video content 63 of next AV data-unit pair 53 begins at the 40 second mark. Thus, there is a 30 second gap in the video content. In the present case, because the audio is continuous (e.g., has no gap), it would be desirable to not collapse the audio or video contents of the two consecutive AV data-unit pair 51 and 53, since collapsing the video content would put the audio and video content out of sync by 30 seconds. If one were using the ffmpeg tool, one could set the dts_delta_threshold option to 30 seconds to make sure the video gap is not collapsed. However, ffmpeg would then use the same 30 seconds threshold for all gaps in the stream (e.g., broadcast), so that if there is were 25 second ad breaks, then ffmpeg would not collapse those 25 seconds gaps in audio and video contents and the VOD would freeze for 25 seconds before playing the ad. By contrast, the pre-muxer 14 may again identify the time difference (e.g., gap) between the earlier starting of the audio content 59 and video content 63 of the next AV data-unit pair 53 and the later-ending of the audio content 57 and video content 61 of the first AV data-unit pair 51. In the present case, because there is no gap in the audio content, the difference (e.g., the time-adjustment value or local offset) is zero seconds, and so no adjustment to the video content stream is made, as is desired.

Figure 5:
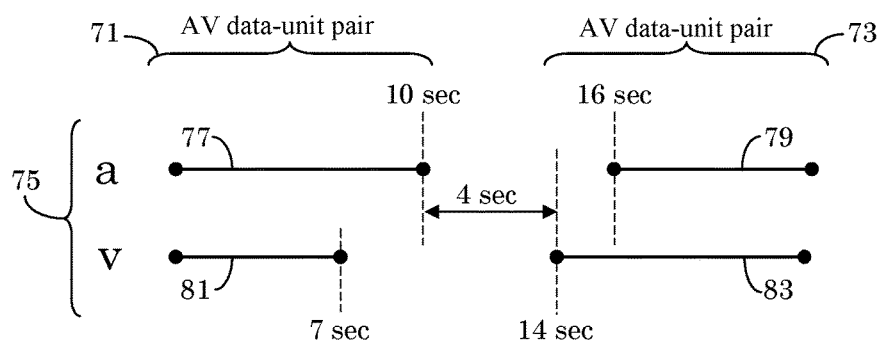
FIG. 5 illustrates and example where the audio content drops late and returns late.
Figure 5:
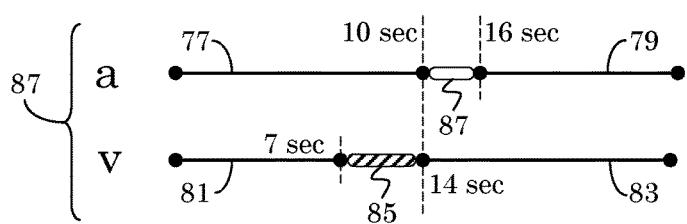

FIG. 5 illustrates an example where the audio content drops late and returns late. In the present live video stream 75, the audio content 77 of the first AV data-unit pair 71 drops off after the video content 81, and the audio content 79 of the next AV data-unit pair 73 returns after the return of the video content 83. Without the pre-muxer 14, the ffmpeg tool would be faced with a similar situation as that of FIG. 2, and would either not collapse anything resulting in long gaps in both audio and video content, or would collapse the audio content resulting in the video and audio content falling out of sync. In the present case, however, the pre-muxer 14 identifies the time difference between the earlier starting of the audio content 79 and video content 83 of the next AV data-unit pair 73 and the later-ending of the audio content 77 and video content 81 of the first AV data-unit pair 71. In the present case, the earlier starting content of next AV data-unit pair 73 is video content 83, which starts at time 14 seconds, and the later-ending content of first AV data-unit pair 71 is audio content 77, which ends at time 10 seconds. The difference between these two is a time-adjustment value (or local offset) of (14-10) 4 seconds. Therefore, the a time-adjustment value of 4 seconds is subtracted from audio content 79 and video content 83 of the next AV data-unit pair 73 causing a 4 second collapse in their respective gaps, as is illustrated by collapsed AV stream 87. This results in a reduced video gap 85 of three seconds (e.g., 14 sec. starting-4 sec. collapsed-7 sec. ending time) during which a frozen image (e.g., the last image frame provided by video content 81) is displayed. This also results in a reduced audio gap of two seconds (16 sec. starting-4 sec. collapse-10 sec. ending), which is filled with an encoded silence sequence 87 so as avoid any gaps in the encoded audio stream. That is, the pre-mux first closes the gap by the time-adjustment value and then patches any remaining gaps in the audio stream with silence (e.g., an encoded silence sequence). This may accommodate some industry tools like FnF and Shaka players, which compute dt/pts relatively and will go out of sync when playing through such gaps in audio. Following the pre-muxer 14, the resultant collapsed and cleaned-up AV stream 87 may be re-muxed by muxing block 15, see FIG. 1, which may use typical industry tools (e.g., MP4Box or other multimedia packager) to create a VOD file.

There are several cases where audio and video timestamps jump forward, backwards or not, and all occur with varying frequencies. The pre-muxer 14 looks at each jump in timestamps (or audio content segments and video content segments) independently and makes the best local decision to prevent stalls and AV sync issues. It also makes sure that effects of each local decision are applied to all subsequent segments.

Figure 6:
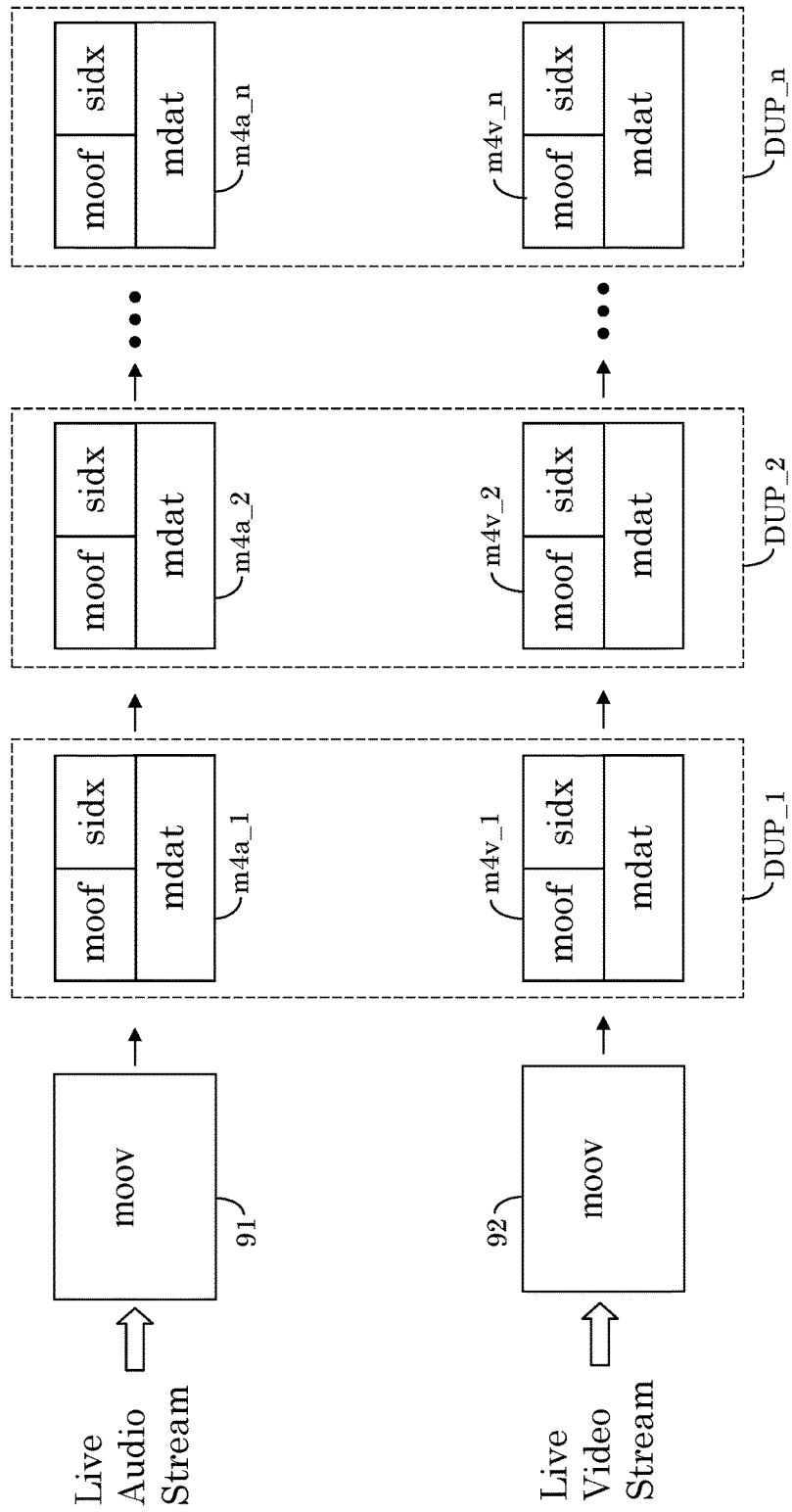
FIG. 6 illustrates simplified segments of a typical mp4 encoding used for live DASH.

FIG. 6 illustrates simplified segments of a typical mp4 encoding used for live DASH. The live audio stream and live video stream each consist of a respective series of segments, wherein each segment may be a self-contained data unit that contains information about the video. Each series of segments includes a respective init segment (e.g., moov data unit 91 of the live audio stream and moov data unit 92 of the live video stream), which may define initialization features such as the timescale, display characteristics, etc. The series of segments of live audio stream further has a list (e.g., sequence or series) of m4a (audio) segments, or data units, m4a_1 to m4a_n. Similarly, the series of segments of live video stream has list (e.g., sequence or series) of m4v (video) segments, or data units, m4v_1 to m4v_n. The pre-muxer uses information in the m4a and m4v data units to correct for time gaps, such as described above, and modifies the m4a and m4v data units prior to them being submitting to muxing block 15 of FIG. 1. Corresponding (audio) m4a segment and (video) m4v segments may be arranged into data-unit pairs, e.g., DUP_1 to DUP_n, in accordance to their start time, which is specified by their respective timestamp. Each m4a and m4v data unit may include three categories, or boxes, of information: moof, sidx, and mdat. Box moof may specify the location of the content(s), indicate whether the content is video or audio, what code is used, the base media decode time (e.g., the sum of the decode durations of all earlier samples, or content segments, in the media), etc. Box sidx provides the timestamp, and may indicate the start time (e.g., presentation time) and duration of the content. Category mdat is the actual content, audio or video. The pre-muxer 14 may change the presentation time in the sidx box and the base media decode time in the moof box to rewrite the time of an audio or video segment. However, the pre-muxer 14 does not change the duration or the (audio or video) contents of the segment.

In the DASH-Remux Pipeline, see FIG. 1, the pre-muxer may process (e.g., reduce gaps and pad with silence any remaining gaps in audio) the m4a and m4v segments before they are concatenated with the init segment (e.g., the moov block). Muxing block 15 may then run MP4Box, or other multimedia packager, to remux the segmented DASH format to fragmented DASH format for VOD delivery.

Figure 7:
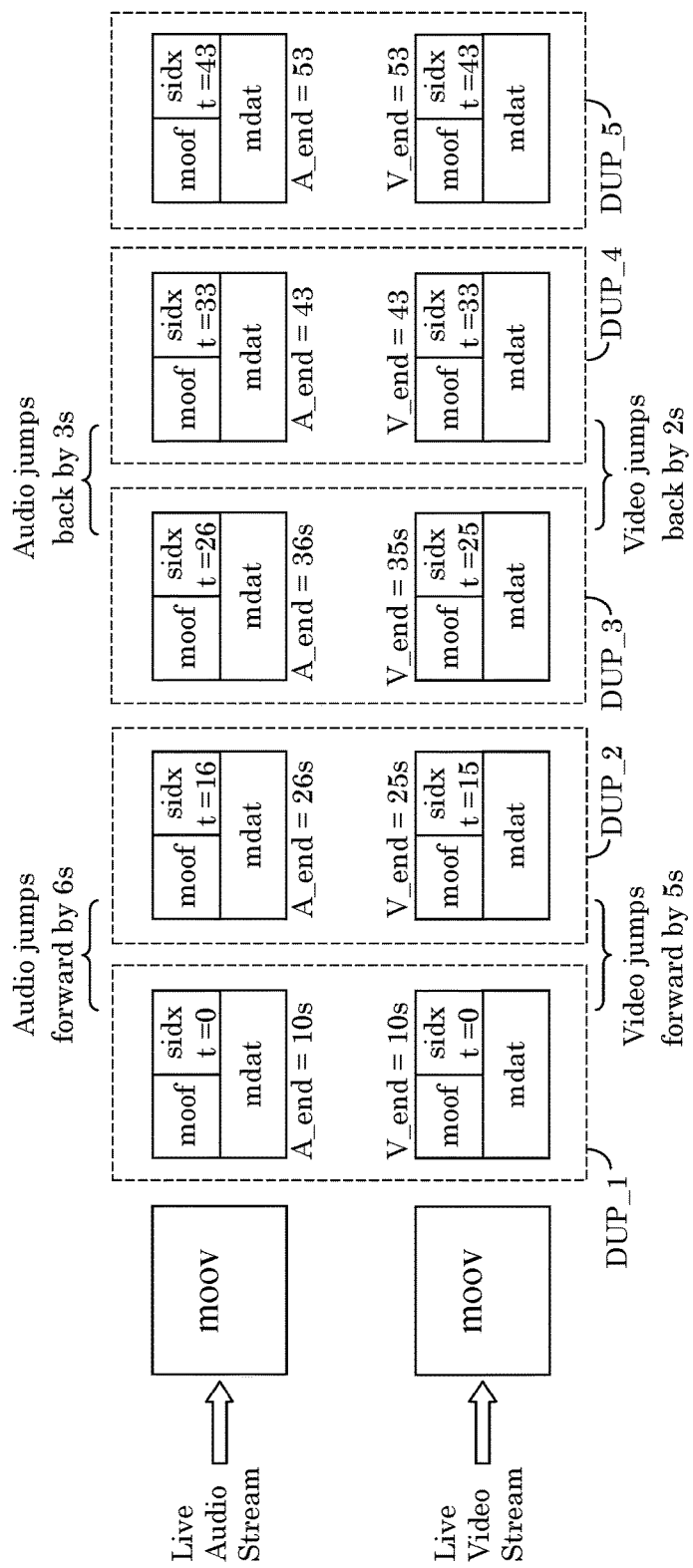
FIG. 7 illustrates an example of how the pre-muxer rewrites timestamps for a live video stream that has two jumps, e.g., time gaps.

FIG. 7 illustrates an example of how the pre-muxer rewrites timestamps for a live video stream that has two jumps, e.g., time gaps. For the sake of simplicity, in this example, each segment is assumed to be 10 seconds in duration, such that the end time of any segment may be determined by adding 10 seconds to the segment's start time. The present example, adds a silence buffer, when needed, into the audio stream since many multimedia players use the audio stream as reference, and it is desirable that they do not detect a gap in the encoded audio stream. A series of 5 data-unit pairs, DUP_1 to DUP_5, are shown. As is explained above, each data-unit pair includes a respective audio data unit (e.g., m4a) and a corresponding video data unit (e.g., m4v). Within each m4v data unit and m4a data unit, letter "t" in box sidx indicates the start time for that segment (e.g., its timestamp). The audio and video data units, m4a and m4v, may be arranged in sequence in chronological starting order, e.g., arranged according to their start time "t". For ease of discussion under each m4a data unit and over each m4v data unit, its respective end time, A_end and V_end, (as determined by adding 10 seconds to its respective "t" start time) is posted. The pre-muxer 14 iterates through each audio and video segment pair (e.g., data-unit pair) looking for jumps, e.g., gaps in the ending time of one data unit and the start time of the next, corresponding data unit, in the sequence. For example, the end-time of the audio segment of DUP_1 is 10 sec., but the start time "t" of the audio segment in next DUP_2 is 16 sec.

For example, when the pre-muxer encounters the jump between DUP_1 and DUP_2, it identifies 10 s as the latest end-time of DUP_1 and 15 s as the earliest start time of DUP_2. Therefore, it computes a time-adjustment value (local offset) of 15 s–10 s=5 s, and determines that all subsequent data units (e.g., audio and video segments) should be pulled in by 5 seconds. Since this is the first offset found, it becomes a global running offset for the series. Because the audio stream had a 6 s gap, collapsing by 5 s still leaves a is gap (from 10 s to 11 s), which is padded (e.g., filled in) by an encoded silence buffer to make sure tools like FnF and Shaka players won't go out of sync as explained above.

The pre-muxer continues to move (shift) the presentation time "t" of segment pairs DUP_2 and DUP_3 by 5 s (a running offset) until it encounters another jump between segment pairs DUP_3 and DUP_4. At this point, the pre-muxer identifies time 36 s as the end of the segment pair DUP_3 (e.g. the later ending time of the audio content and video content of DUP_3), and identifies 33 s as the start of segment pair DUP_4 (the earlier starting time of the audio content and video content of DUP_4). Therefore, the pre-muxer computes a time-adjustment value (or local offset) of 33 s–36 s=–3 s, and determines that all subsequent data units (e.g., audio and video segments) should be shifted by –3 seconds. The pre-mux may do this by adding this local offset of –3 to the running (global) offset of 5 s, and moving the presentation time of all subsequent segments by 2 s.

Figure 8:
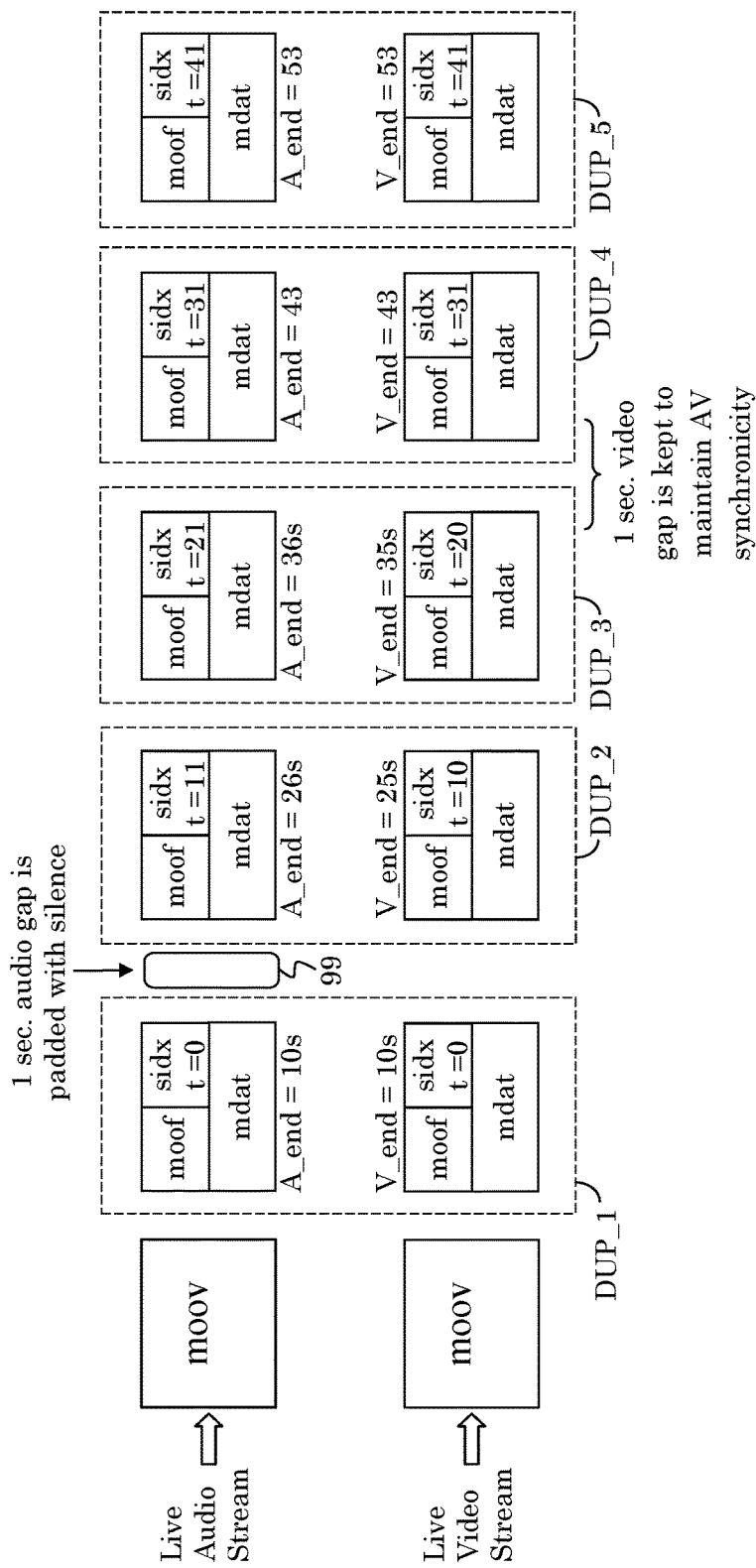
FIG. 8 illustrate an example of final timestamps, and audio and video data units, after the pre-muxer finishes processing the audio and video stream of FIG. 7.

FIG. 8 illustrates an example of final timestamps in the audio and video data units after the pre-muxer finishes processing the audio and video stream of FIG. 7. As shown, in segment pair DUP_2, the presentation time "t" of the audio data unit (in box sidx) is change from its original value 16 s to 11 s (e.g., 16 s−5 s). This still has a is gap between the end time (10 s) of the audio segment of DUP_1 and the start (11 s) of the audio segment of DUP_2. This is gap is filled with an encoded silence 99. Similarly, the video segment of DUP_2 is reduced by 5 s to a presentation time (e.g., starting timestamp) of "t"=(15 s−5 s)=10 s.

Since there is no change to the running offset at DUB_3, the presentation times "t" of its audio segment and video segment are both reduced by 5. That is, the start time of its audio segment is changed from 26 s to 21 s, and the start time of its video segment is changed from 25 s to 20 s.

As is explained above in reference to FIG. 7, at DUP_4, the running (global) offset is reduced to 2 s. Therefore, the presentation time "t" of the audio segment of DUP_4 is changed from 33 s to 3 is, and the presentation time of its video segment is changed from 33 s to 31 s. At this point, a 1 sec. gap remains between the video segment of DUP_3 and the video segment of DUP_4, but this 1 sec. gap is kept to maintain audio-video synchronicity. Additionally, since there are no additional changes to the running offset after DUP_4, the audio and video segments of DUP_5 are each reduced by 2 s as compared to those listed in FIG. 7. The next step would be for muxing block 15 to remux the audio and video streams of FIG. 8.

Figure 9:
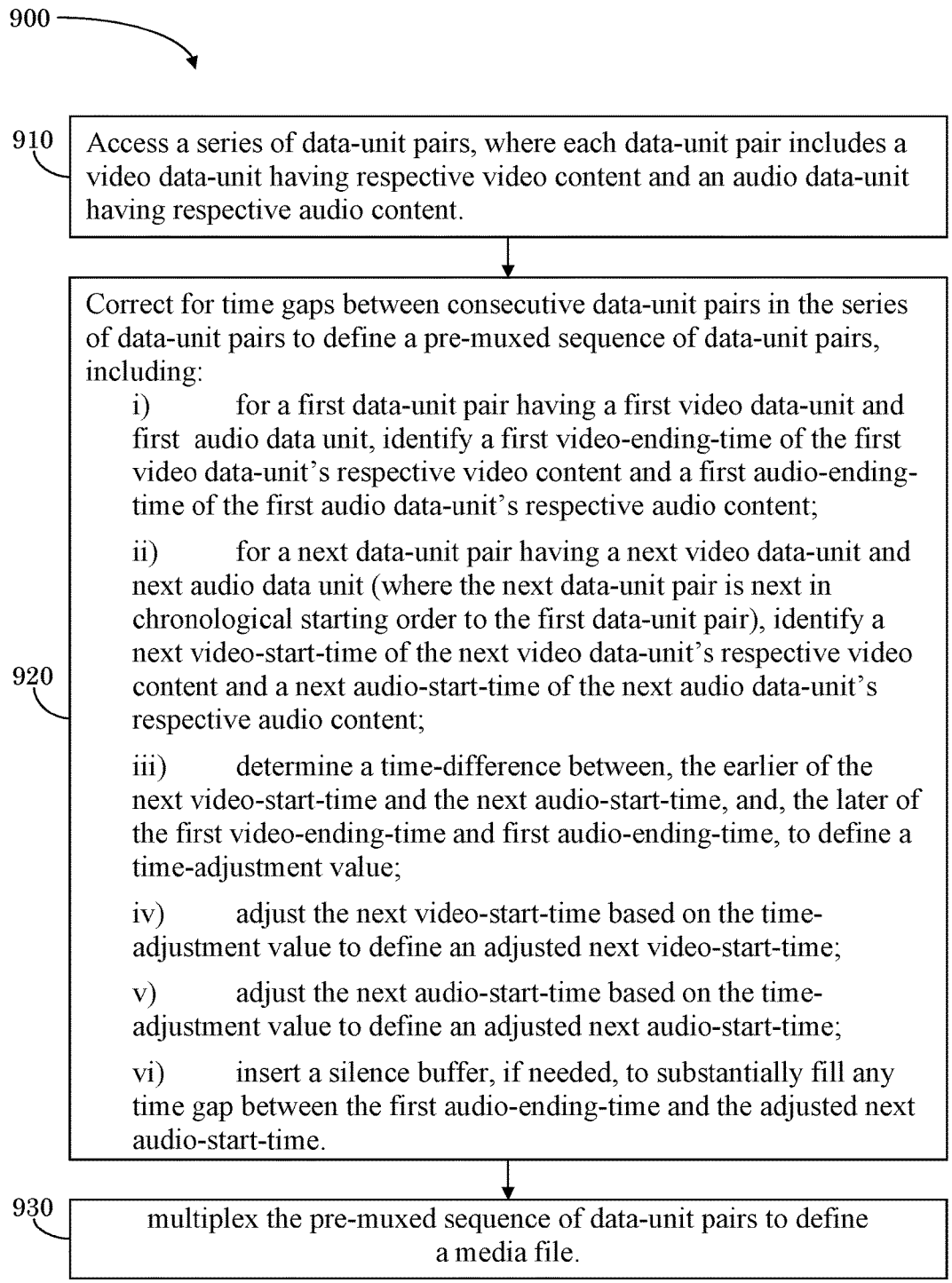
FIG. 9 illustrates an example method for pre-muxing a live video stream to correct for gaps in audio and video segments in preparation for remixing the live video stream into a multimedia (e.g., VOD) file.

FIG. 9 illustrates an example method 900 for pre-muxing a live video stream to correct for gaps in audio and video segments in preparation for remixing the live video stream into a multimedia (e.g., VOD) file. The method may begin at step 910, where a computing device, such as a Facebook server, accesses a series (or sequence) of data-unit pairs (e.g., audio-video segment pairs), such as received via a live video stream. That is, each data-unit pair (e.g. DUP_1 to DUP_n) includes a video data-unit (e.g., a video segment or m4v) having respective video content and an audio data-unit (e.g., audio segment or m4a) having respective audio content. At step 920, the received sequence of data-unit pairs are pre-muxed to clean time gap errors in preparation for a remuxing step, which generates the multimedia file. Pre-muxing removes or reduces time gaps while maintaining time synchronicity among all corresponding audio segments and video segments. That is, pre-muxing corrects for time gaps between consecutive data-unit pairs in the series of data-unit pairs to define a pre-muxed sequence of data-unit pairs, including the following sub-steps. The first three sub-steps, (i), (ii), and (iii) basically determine any time gap between the end of a first data-unit pair and the start of the next data-unit pair. Any identified time gap may be termed a time-adjustment value. In sub-step (i), for a first data-unit pair having a first video data-unit and first audio data unit, the sub-step identifies a first video-ending-time of the first video data-unit's respective video content and a first audio-ending-time of the first audio data-unit's respective audio content. In sub-step (ii), for a next data-unit pair having a next video data-unit and next audio data unit (where the next data-unit pair is next in chronological starting order to the first data-unit pair), the sub-step identifies a next video-start-time of the next video data-unit's respective video content and a next audio-start-time of the next audio data-unit's respective audio content. Sub-step (iii) determines a time-difference between, the earlier of the next video-start-time and the next audio-start-time, and, the later of the first video-ending-time and first audio-ending-time, to define a time-adjustment value. Sub-steps (iv) and (v) adjust the audio segment and video segment of the next data-unit pair using the identified time-adjustment value, which may have a value of zero if there is no time gap between the end of the first data-unit pair and start of the next data-unit pair. That is, sub-step (iv) adjusts the next video-start-time based on the time-adjustment value to define an adjusted next video-start-time, and sub-step (v) adjusts the next audio-start-time based on the time-adjustment value to define an adjusted next audio-start-time. If, after adjusting the audio segment of the next data-unit pair, there is still a time gap between the audio segment of the first data-unit pair and the audio segment of the next data-unit pair, then this time gap is filled with an (encoded) silence buffer (e.g., a silence sequence). Thus in sub-step (vi), a silence buffer is inserted, if needed, to substantially fill any time gap between the first audio-ending-time and the adjusted next audio-start-time. At step 930, the pre-muxed sequence of data-unit pairs resulting from step 920 may be (re-)multiplexed to define a media file. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for pre-muxing a live video stream to correct for gaps in audio and video segments including the particular steps of the method of FIG. 9, this disclosure contemplates any suitable method for pre-muxing a live video stream to correct for gaps in audio and video segments in preparation for remixing the live video stream into a multimedia (e.g., VOD) file, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
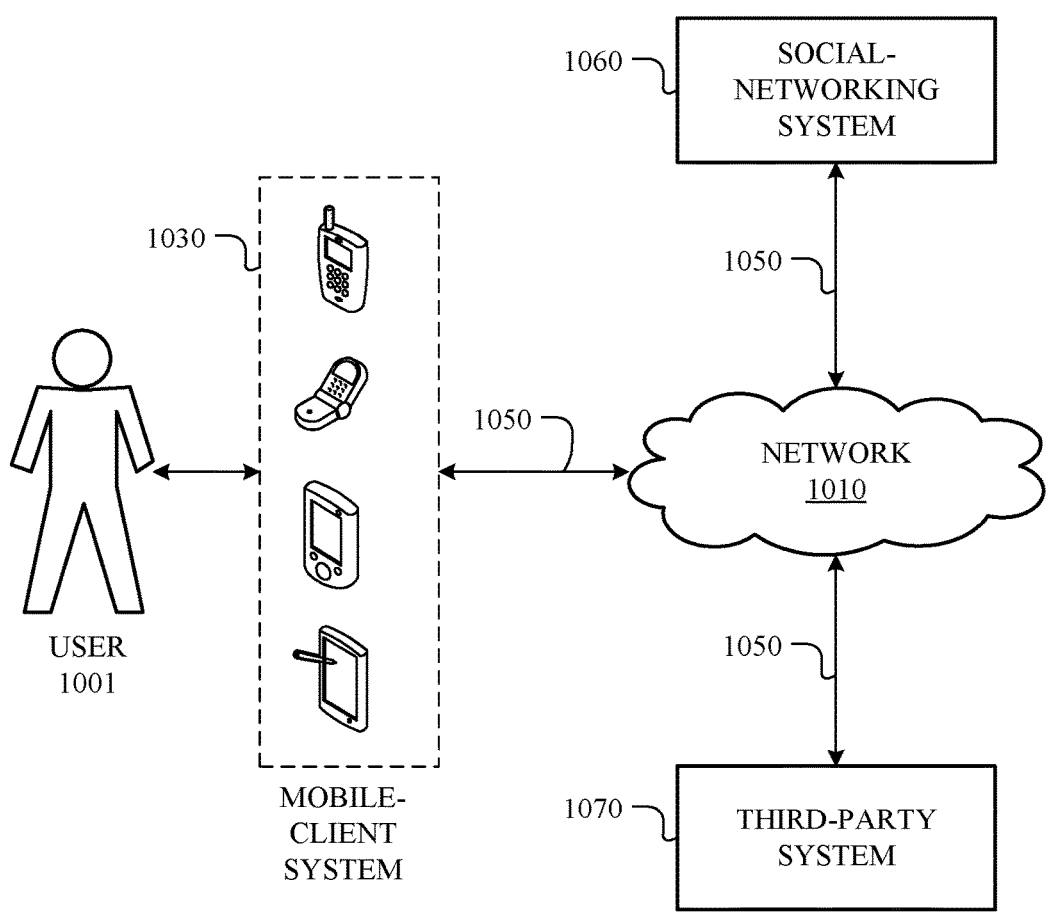
FIG. 10 illustrates an example network environment associated with a social-networking system.

FIG. 10 illustrates an example network environment 1000 associated with a social-networking system. Network environment 1000 includes a user 1001, a client system 1030, a social-networking system 1060, and a third-party system 1070 connected to each other by a network 1010. Although FIG. 10 illustrates a particular arrangement of user 1001, client system 1030, social-networking system 1060, third-party system 1070, and network 1010, this disclosure contemplates any suitable arrangement of user 1001, client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of users 1001, client systems 1030, social-networking systems 1060, third-party systems 1070, and networks 1010, this disclosure contemplates any suitable number of users 1001, client systems 1030, social-networking systems 1060, third-party systems 1070, and networks 1010. As an example and not by way of limitation, network environment 1000 may include multiple users 1001, client system 1030, social-networking systems 1060, third-party systems 1070, and networks 1010.

In particular embodiments, user 1001 may be an individual (human user), an entity (e.g., an enterprise, business, or third-party application), or a group (e.g., of individuals or entities) that interacts or communicates with or over social-networking system 1060. In particular embodiments, social-networking system 1060 may be a network-addressable computing system hosting an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include an authorization server (or other suitable component(s)) that allows users 1001 to opt in to or opt out of having their actions logged by social-networking system 1060 or shared with other systems (e.g., third-party systems 1070), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 1070 may be a network-addressable computing system that can host live video streams. Third-party system 1070 may generate, store, receive, and send live video streams (e.g., broadcasts), such as, for example, live video streaming of sporting events. Third-party system 1070 may be accessed by the other components of network environment 1000 either directly or via network 1010. In particular embodiments, one or more users 1001 may use one or more client systems 1030 to access, send data to, and receive data from social-networking system 1060 or third-party system 1070. Client system 1030 may access social-networking system 1060 or third-party system 1070 directly, via network 1010, or via a third-party system. As an example and not by way of limitation, client system 1030 may access third-party system 1070 via social-networking system 1060. Client system 1030 may be any suitable computing device, such as, for example, a personal computer, a laptop computer, a cellular telephone, a smartphone, a tablet computer, or an augmented/virtual reality device.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

Figure 11:
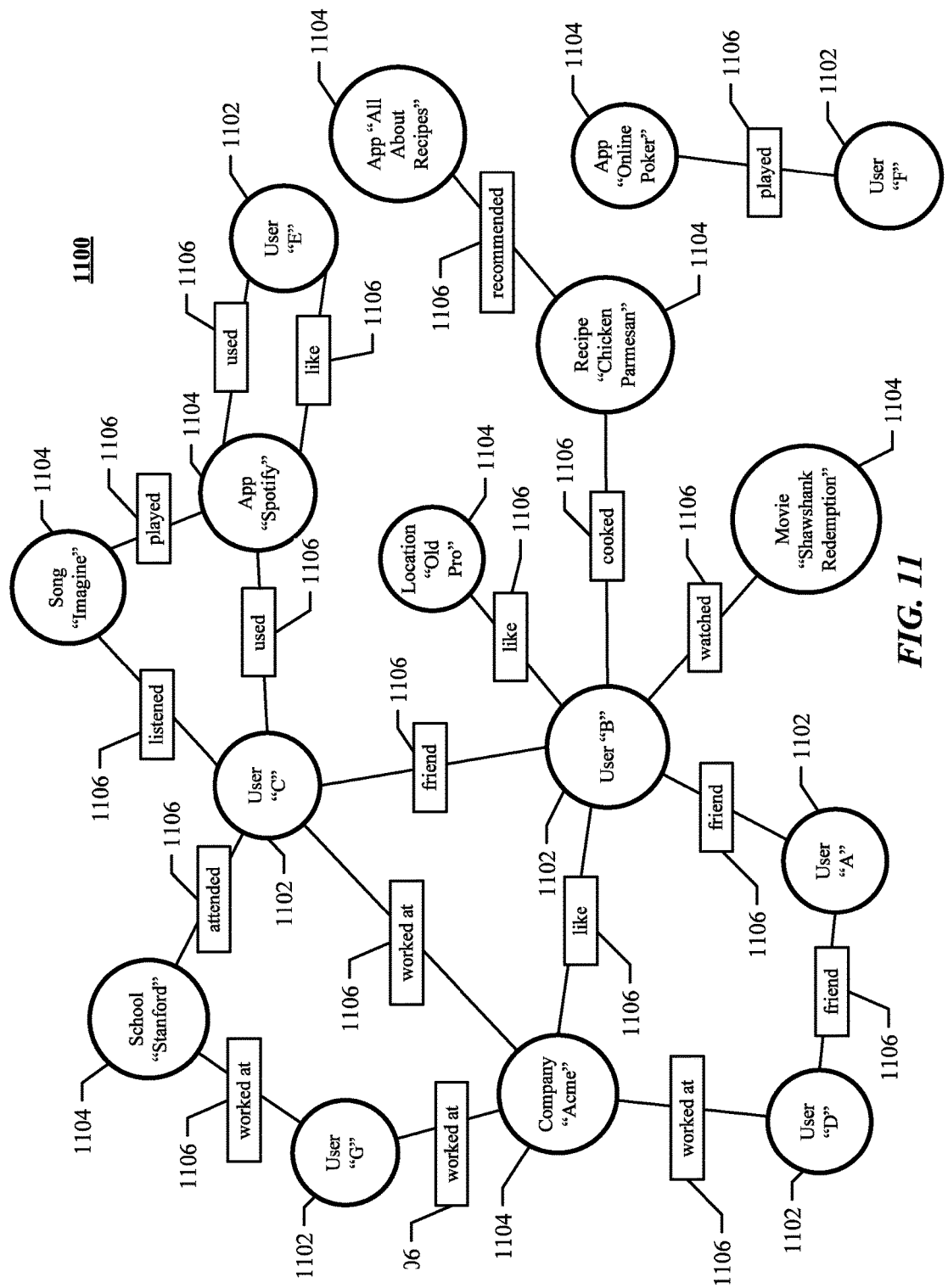
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes-which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party system 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1030 to send to social-networking system 1060 a message indicating the user's action. In response to the message, social-networking system 1060 may create an edge (e.g., a check-in-type edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social-networking system 1060 or shared with other systems (e.g., third-party system 1070). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1070, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1062 may be authorization/privacy servers for enforcing privacy settings. In response to a request from a user (or other entity) for a particular object stored in a data store 1064, social-networking system 1060 may send a request to the data store 1064 for the object. The request may identify the user associated with the request and may only be sent to the user (or a client system 1030 of the user) if the authorization server determines that the user is authorized to access the object based on the privacy settings associated with the object. If the requesting user is not authorized to access the object, the authorization server may prevent the requested object from being retrieved from the data store 1064, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 12:
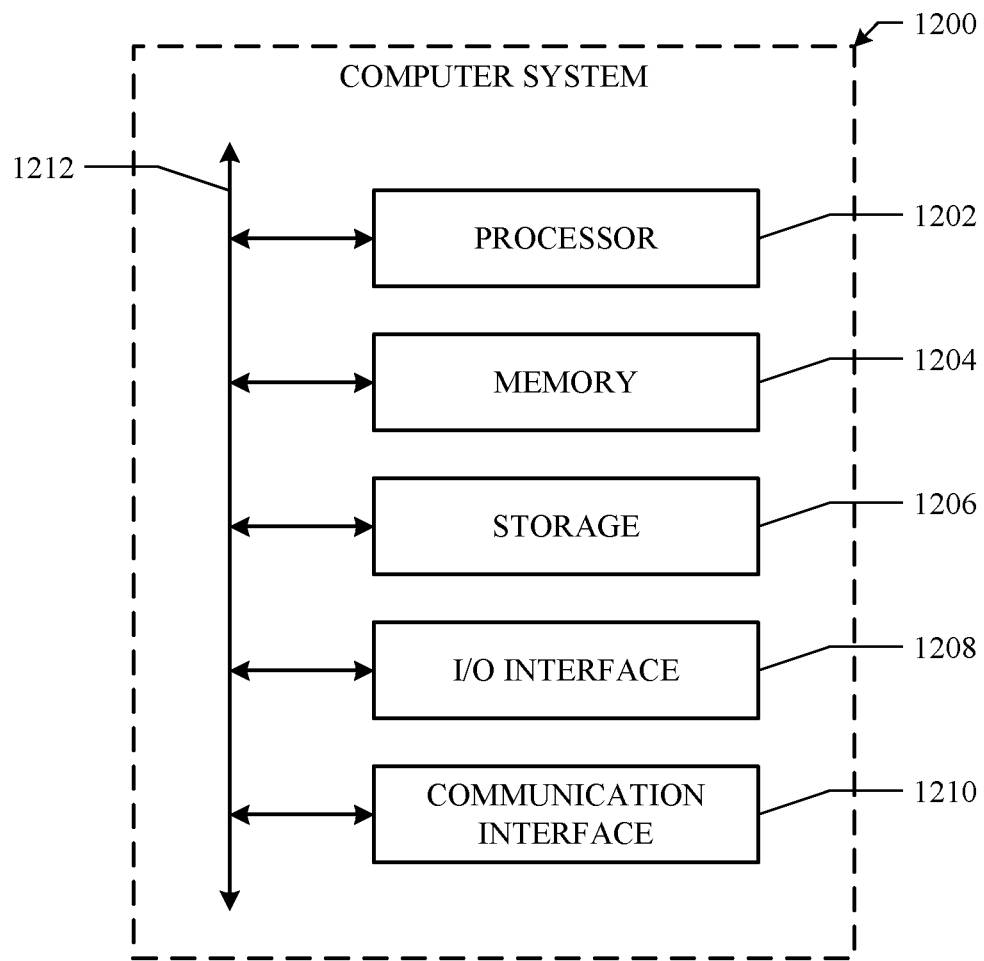
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206.

Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   by a computing device, accessing a series of data-unit pairs, each data-unit pair including a video data-unit having respective video content and an audio data-unit having respective audio content;
   by the computing device, correcting for time gaps between consecutive data-unit pairs in the series of data-unit pairs to define a pre-muxed sequence of data-unit pairs, including:

i) for a first data-unit pair having a first video data-unit and first audio data unit, identifying a first video-ending-time of the first video data-unit's respective video content and a first audio-ending-time of the first audio data-unit's respective audio content;

ii) for a next data-unit pair having a next video data-unit and next audio data unit, the next data-unit pair being next in chronological starting order to the first data-unit pair, identifying a next video-start-time of the next video data-unit's respective video content and a next audio-start-time of the next audio data-unit's respective audio content;

iii) determining a time-difference between, the earlier of the next video-start-time and the next audio-start-time, and the later of the first video-ending-time and first audio-ending-time, to define a time-adjustment value;

iv) adjusting the next video-start-time based on the time-adjustment value to define an adjusted next video-start-time;

v) adjusting the next audio-start-time based on the time-adjustment value to define an adjusted next audio-start-time; and vi) inserting a silence buffer to substantially fill any time gap between the first audio-ending-time and the adjusted next audio-start-time; and by the computing device, multiplexing the pre-muxed sequence of data-unit pairs to define a media file.

2. The method of claim 1, wherein:

the method further comprises a running offset comprised of a sum of the current time-adjustment value and all previous time-adjustment values determined during the correcting for time gaps between consecutive data-unit pairs in the series of data-unit pairs; and the next video-start-time and the next audio-start-time are adjusted by subtracting the running offset from each of the next video-start-time and the next audio-start-time.

3. The method of claim 1, wherein the next video-start-time and the next audio-start-time are adjusted by subtracting the time-adjustment value from each of the next video-start-time and the next audio-start-time.

4. The method of claim 1, wherein at least one of the next video-start-time and the next audio-start-time precedes at least one of first video-ending-time and first audio-ending-time.

5. The method of claim 4, wherein in step (iii), the time-difference is determined by subtracting the later of the first video-ending-time and first audio-ending-time from the earlier of the next video-start-time and the next audio-start-time to define the time-adjustment value.

6. The method of claim 1, wherein:

each video data-unit further includes a video-time-stamp indicting a start time for its respective video content, and each audio data-unit further includes an audio-time-stamp indicting a start time for the respective audio content;

in step (iv), adjusting the next video-start-time includes rewriting the video-time-stamp of the of the next video data-unit; and in step (v), adjusting the next audio-start-time includes rewriting the audio-time-stamp of the of the next video data-unit.

7. The method of claim 6, wherein;

the video content and audio content of all data-unit pairs in the series of data-unit pairs are of a same, predefined time duration;

in step (i), the first video-ending-time is identified based on the video-time-stamp of the first video data-unit and the predefined time duration, and the first audio-ending-time is identified based on the audio-time-stamp of the first audio-unit and the predefined time duration; and in step (ii), the next video-start-time is identified based on the video-time-stamp of the of the next video data-unit, and the next audio-start-time is identified based on the audio-time-stamp of the next audio data-unit.

8. The method of claim 1, wherein:

in each data-unit pair, the video data-unit further includes a video-time-stamp indicting a start time for the respective video content and a video-duration indicator indicating a duration of the respective video content, the audio data-unit further includes an audio-time-stamp indicting a start time for the respective audio content, and an audio-duration indicator indicating a duration of the respective audio content; and in step (i), the first video-ending-time is identified based on the video-time-stamp and video-duration indicator of the first data unit, and the first audio-ending-time is identified based on the audio-time-stamp and audio-duration indicator of the first audio data-unit.

9. The method of claim 1, wherein the series of data-unit pairs are received over a network from a client computing device using a network protocol lacking handshaking dialogues.

10. The method of claim 1, wherein the series of data-unit pairs are received from a client computing device with no guarantee of delivery or ordering.

11. The method of claim 1, wherein the series of data-unit pairs are received from a client computing device in the form of a live video feed from the client computing device.

12. The method of claim 1, wherein the media file is stream-packaged for video-on-demand transmission from the computing device to at least one client computing device.

13. One or more computer-readable non-transitory storage media embodying software that is operable when executed to:

access a series of data-unit pairs, each data-unit pair including a video data-unit having respective video content and an audio data-unit having respective audio content;

correct for time gaps between consecutive data-unit pairs in the series of data-unit pairs to define a pre-muxed sequence of data-unit pairs, including:

i) for a first data-unit pair having a first video data-unit and first audio data unit, identifying a first video-ending-time of the first video data-unit's respective video content and a first audio-ending-time of the first audio data-unit's respective audio content;

ii) for a next data-unit pair having a next video data-unit and next audio data unit, the next data-unit pair being next in chronological starting order to the first data-unit pair, identifying a next video-start-time of the next video data-unit's respective video content and a next audio-start-time of the next audio data-unit's respective audio content;

iii) determining a time-difference between, the earlier of the next video-start-time and the next audio-start-time, and, the later of the first video-ending-time and first audio-ending-time, to define a time-adjustment value;

iv) adjusting the next video-start-time based on the time-adjustment value to define an adjusted next video-start-time;

v) adjusting the next audio-start-time based on the time-adjustment value to define an adjusted next audio-start-time; and vi) inserting a silence buffer to substantially fill any time gap between the first audio-ending-time and the adjusted next audio-start-time; and multiplex the pre-muxed sequence of data-unit pairs to define a media file.

14. The media of claim 13, wherein:

the software is further operable when executed to define a running offset comprised of a sum of the current time-adjustment value and all previous time-adjustment values determined during the correcting for time gaps between consecutive data-unit pairs in the series of data-unit pairs; and the next video-start-time and the next audio-start-time are adjusted by subtracting the running offset from each of the next video-start-time and the next audio-start-time.

15. The media of claim 13, wherein at least one of the next video-start-time and the next audio-start-time precedes at least one of first video-ending-time and first audio-ending-time.

16. The media of claim 13, wherein the series of data-unit pairs are received in the form of a live video feed from a client computing device with no guarantee of delivery or ordering.

17. A system comprising:

one or more processors; and one or more computer-readable non-transitory storage media coupled to one or more of the processors and comprising instructions operable when executed by one or more of the processors to cause the system to:

access a series of data-unit pairs, each data-unit pair including a video data-unit having respective video content and an audio data-unit having respective audio content;

correct for time gaps between consecutive data-unit pairs in the series of data-unit pairs to define a pre-muxed sequence of data-unit pairs, including:

i) for a first data-unit pair having a first video data-unit and first audio data unit, identifying a first video-ending-time of the first video data-unit's respective video content and a first audio-ending-time of the first audio data-unit's respective audio content;

ii) for a next data-unit pair having a next video data-unit and next audio data unit, the next data-unit pair being next in chronological starting order to the first data-unit pair, identifying a next video-start-time of the next video data-unit's respective video content and a next audio-start-time of the next audio data-unit's respective audio content;

iii) determining a time-difference between, the earlier of the next video-start-time and the next audio-start-time, and, the later of the first video-ending-time and first audio-ending-time, to define a time-adjustment value;

iv) adjusting the next video-start-time based on the time-adjustment value to define an adjusted next video-start-time;

v) adjusting the next audio-start-time based on the time-adjustment value to define an adjusted next audio-start-time; and vi) inserting a silence buffer to substantially fill any time gap between the first audio-ending-time and the adjusted next audio-start-time; and multiplex the pre-muxed sequence of data-unit pairs to define a media file.

18. The system of claim 17, wherein:

the processors are further operable when executing the instructions to define a running offset comprised of a sum of the current time-adjustment value and all previous time-adjustment values determined during the correcting for time gaps between consecutive data-unit pairs in the series of data-unit pairs; and the next video-start-time and the next audio-start-time are adjusted by subtracting the running offset from each of the next video-start-time and the next audio-start-time.

19. The system of claim 17, wherein at least one of the next video-start-time and the next audio-start-time precedes at least one of first video-ending-time and first audio-ending-time.

20. The system of claim 17, wherein the series of data-unit pairs are received from a client computing device in the form of a live video feed with no guarantee of delivery or ordering.

* * * * *